United States Patent
Bar et al.

(10) Patent No.: US 9,915,969 B2
(45) Date of Patent: Mar. 13, 2018

(54) COHERENT TIMER MANAGEMENT IN A MULTICORE OR MULTITHREADED SYSTEM

(71) Applicant: Freescale Semiconductor, Inc., Austin, TX (US)

(72) Inventors: Ron-Michael Bar, Ramat Hasharon (IL); Evgeni Ginzburg, Petah Tikva (IL); Eran Glickman, Rishon Le Zion (IL)

(73) Assignee: NXP USA, Inc., Austin, TX (US)

( * ) Notice: Subject to any disclaimer, the term of this patent is extended or adjusted under 35 U.S.C. 154(b) by 71 days.

(21) Appl. No.: 14/797,286

(22) Filed: Jul. 13, 2015

(65) Prior Publication Data

US 2017/0017259 A1    Jan. 19, 2017

(51) Int. Cl.
*G06F 1/04* (2006.01)
*G06F 1/10* (2006.01)

(52) U.S. Cl.
CPC ..................................... *G06F 1/10* (2013.01)

(58) Field of Classification Search
None
See application file for complete search history.

(56) References Cited

U.S. PATENT DOCUMENTS 4,635,187 A * 1/1987 Baron .................. G06F 9/4825
                                                      718/100
5,838,957 A    11/1998 Rajaraman et al.
2004/0205753 A1  10/2004 Moore et al.
2005/0144330 A1   6/2005 Richards et al.
2007/0022192 A1   1/2007 Nguyen
2009/0074422 A1 *  3/2009 Stewart .................. G01S 3/786
                                                      398/118

FOREIGN PATENT DOCUMENTS

CN    101673222 B    2/2012

OTHER PUBLICATIONS

U.S. Appl. No. 14/797,285, filed Jul. 13, 2015, listing Ron-Michael Bar as inventor, entitled: "Timer Rings Having Different Time Unit Granularities".
Non-Final Office Action mailed Apr. 21, 2017 for U.S. Appl. No. 14/797,285, 18 pages.

(Continued)

*Primary Examiner* — Nitin Patel

(57) ABSTRACT

In a processing system, a method includes transmitting a timer expiration notification from a timer management component of a processor to one or more other components of the processor in response to expiration of a timer. The method further includes transmitting, from a component of the processor that requested instantiation of the timer, a timer release confirmation message to the timer management component in response to the timer expiration notification, the timer release confirmation message confirming that the component has released the timer. The method also includes preventing reallocation of a timer identifier (ID) associated with the timer to another timer after the expiration of the timer and until receipt of the timer release confirmation message at the timer management component.

20 Claims, 8 Drawing Sheets

(56) References Cited

OTHER PUBLICATIONS

U.S. Appl. No. 14/797,285, Inventor Ron Michael Bar, "Timer Rings Having Different Time Unit Granularities", filed Jul. 13, 2015, Office Action—Final Rejection, dated Aug. 9, 2017.
U.S. Appl. No. 14/797,285, Inventor Ron Michael Bar, "Timer Rings Having Different Time Unit Granularities", filed Jul. 13, 2015, Notice of Allowance, dated Oct. 27, 2017.
Final Office Action dated Aug. 9, 2017 for U.S. Appl. No. 14/797,285, 15 pages.

* cited by examiner

COHERENT TIMER MANAGEMENT IN A MULTICORE OR MULTITHREADED SYSTEM

CROSS-REFERENCE TO RELATED APPLICATIONS

The present application is related to co-pending U.S. patent application Ser. No. 14/797,285, entitled "Timer Rings Having Different Time Unit Granularities" and filed on even date herewith, the entirety of which is incorporated by reference herein.

BACKGROUND

Field of the Disclosure

The present disclosure relates generally to processing systems and, more particularly, to timer management in processing systems.

Description of the Related Art

Processing systems implementing parallel processing increasingly rely on numerous timers to track various tasks. Most timer management systems treat timers not as physical counters, but rather as data elements allocated and instantiated in linked lists tied to a timer ring. Typically, each timer is assigned a unique timer identifier (ID) to facilitate timer identification. When the timer expires, an expiration notification is broadcast throughout the processing system so as to notify the owner of the timer that the timer has expired. It often takes considerable time for the expiration notification to traverse the signal pathways to the owner of the timer, and there is the possibility that the timer ID may be assigned to another timer while the expiration notification is in flight. This can introduce a coherency issue in the event that the original timer owner does not receive the expiration notification, or in the event that the original timer owner is not yet finished using the timer (the original owner may want to reset the timer, for example). In such instances, the same timer ID may be inadvertently assigned to two or more timers, and thus it may be unclear as to the source of a timer command referencing a particular timer ID.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
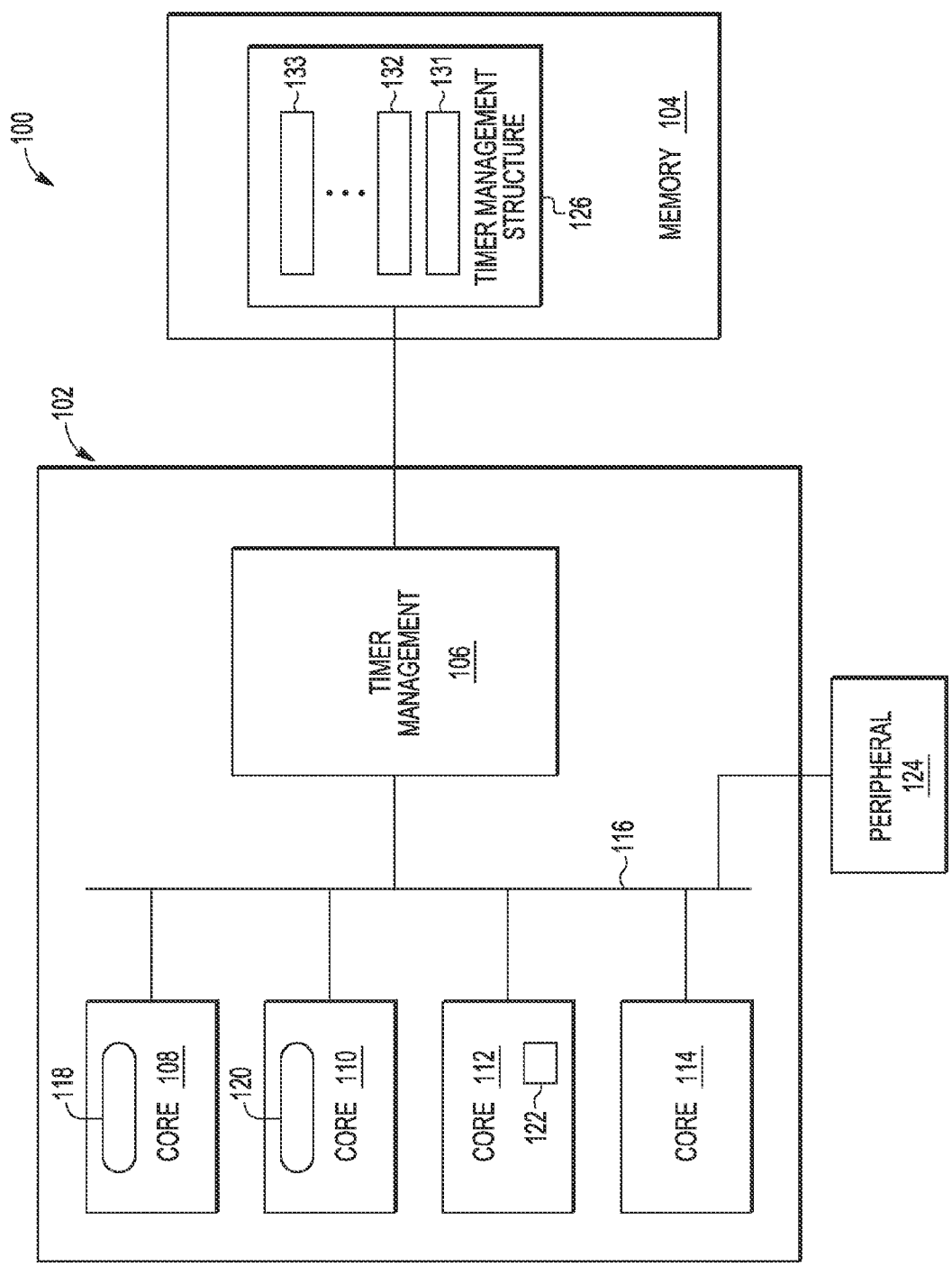
FIG. 1 is a block diagram illustrating a processing system having coherent timer management in accordance with at least one embodiment of the present invention.

FIGS. 1-10 illustrate example techniques for large-scale coherent timer management in a processing system. In at least one embodiment, a timer management component manages timers instantiated in a timer management structure on behalf of executing threads, applications, hardware components of processor cores of the processing system, peripheral components, and other requestor components in the processing system. The timer management component may provide efficient timer ID management through the use of automated timer ID allocation and a hardware/software handshake protocol that facilitates accurate and coherent reuse of timer IDs and prevents timer expirations from flooding processing system. To this end, the time management component maintains a defined set of timer IDs for use in identifying timers. In response to a request to instantiate a timer, the time management component verifies whether a timer ID is not currently in use and thus available for allocation to the requested timer. If a timer ID is available for allocation, the timer management component instantiates the requested timer in the timer management structure and permits allocation of an available timer ID to the instantiated timer.

A timer may comprise one of two types: a "one-shot" timer that expires once and then may released for use by another requestor component; and a "periodic" timer that may be reset to expire again for the same requestor component. When a timer expires, a timer expiration notification that includes the corresponding timer ID is broadcast or otherwise transmitted to the timer owners in the processing system. In response to receiving and processing this expiration notification, the timer owner that requested the timer that has expired sends a completion confirmation message to the time management component so as to confirm that the timer owner has taken notice of the expired timer. In the event that the corresponding timer is a "one-shot" timer, the timer management component holds the timer ID associated with the expired timer in a "non-allocatable" state until the completion confirmation message is received, at which point the timer management component releases the timer ID from its "non-allocatable" state and thus making the timer ID available for reallocation to another timer. This handshake protocol for holding timer IDs until expiration has been confirmed avoids coherency issues due to the transmission delay of expiration notifications. In the event that the timer is a periodic timer, the release of the timer ID permits the timer to be reset so that it may expire again after the corresponding amount of time has lapsed. Moreover, in the case of periodic timers, the timer management component holds the timer ID associated with the expired timer in a "non-resettable" state until the completion confirmation message is received, at which point the timer management component releases the timer ID from its "non-resettable" state and thus enabling the resetting of the corresponding timer. This handshake protocol thus prevents a flood of timer expiration notifications due to periodic timers that have been unnecessarily reset and expired one or more times.

Further, in some embodiments, the timer management component maintains a timer management structure that utilizes different timer rings for different time unit granularities. When a timer is instantiated, it is placed in a corresponding entry of the timer ring associated with the granularity of the timer, and is maintained in this same entry until its expiration. To illustrate, an implementation of this granularity-based timer management structure may maintain three timer rings: an hour granularity timer ring that has a clock tick every hour; a minute granularity timer ring that has a clock tick every minute; and a second granularity timer ring that has a clock tick every second. A timer instantiation request requesting instantiation of a timer having a time span of 2 hours and a granularity at the hour time unit level would be placed in an entry of the hour granularity timer ring that is two hour clock ticks away from the current entry in the hour granularity timer ring. In contrast, a timer request indicating a timer having a time span of 120 minutes and a granularity at the minute time unit level would be placed in an entry of the minute granularity timer ring that is 120 minute clock ticks away from the current entry in the minute hour granularity.

Under this approach, the instantiation of a timer is fixedly maintained in the same linked list in the same entry of the same timer ring during its entire time span. As such, frequent thrashing of the timer management structure due to timer movement among entries as found in conventional approaches may be avoided. Moreover, under this approach, a timer owner may specify the particular granularity needed for a requested timer, and thereby allow the timer management component to better suit the needs of timer owners in the processing system.

FIG. 1 illustrates a processing system 100 employing efficient and coherent timer management in accordance with at least one embodiment of the present invention. The processing system 100 may be implemented in any of a variety of electronic devices or systems, such as a consumer electronic device (e.g., a tablet computer, a notebook computer, a computing-enabled cellphone, a computing-enabled wearable device, etc.), communications device (e.g., a router, a base station, a hub, etc.), a commercial or industrial device, (e.g., an automotive or aeronautical control system or an industrial-scientific-medical (ISM) control system), and the like.

The processing system 100 includes a processor 102 and a memory 104. The processor 102 comprises a timer management component 106 connected to one or more components of the processor 102, such as processor cores 108, 110, 112, 114 (hereinafter, "processor cores 108-114"), via one or more system interconnects 116. The processor cores 108-114 may comprise any of a variety of processing elements, such as a central processing unit (CPU) core, a graphics processing unit (GPU), a digital signal processor (DSP) core, and the like. The timer management component 106, in one embodiment, is a hardware-based component of the processor 102 and is implemented using hardcoded logic or programmable logic. In other embodiments, the timer management component 106 may be implemented at least in part as one or more processor cores executing software initially stored in the memory 104 or other non-transitory computer readable medium, and which manipulates the one or more processor cores to implement certain features described herein.

The memory 104 comprises a volatile or non-volatile memory structure configured to store data and other information for the processor 102. To illustrate, the memory 104 may comprise a random access memory (RAM), and more particularly, a double data rate (DDR) RAM. In the depicted example, the memory 104 is implemented external to the processor 102 (e.g., as system memory). However, in other embodiments, the memory 104 may be implemented as memory within the processor 102; that is, as "on-chip" memory.

The processor 102 further may include various other components often implemented in a processor and which are omitted from FIG. 1 for purposes of clarity, such as input/output (I/O) controllers, co-processors or other accelerators, boot controllers, memory controllers, various interfaces, and the like. The operations of these components may be supplemented by various external components that may be connected to the processor 102, such as one or more I/O components, mass storage devices, and the like.

Generally, the timer management component 106 is configured to provide timer management for timers instantiated for requesting components (hereinafter, "requestors") within the processor 102. These requestors can comprise software-based requestors, such as, for example, a thread 118 executed by the processor core 108 or an application 120 executed by the processor core 110, or hardware-based requestors, such as a hardcoded component 122 of the core 112 or a peripheral device 124 connected to the processor 102. For ease of reference, a requestor having a timer instantiated in response to a request is referred to herein as a "timer owner."

In at least one embodiment, the timer management component 106 is configured to manage timers through the use of a timer management structure 126 implemented as one or more data structures in a corresponding storage space of the memory 104. As described in greater detail herein, the timer management structure 126 comprises a set of timer rings, such as timer rings 131, 132, 133, with each timer ring being associated with a different time unit granularity. For example, the timer ring 131 may have a granularity of microseconds, the timer ring 132 may have a granularity of milliseconds, and the timer ring 133 may have a granularity of seconds. As another example, the timer ring 131 may have a granularity of seconds, the timer ring 132 may have a granularity of minutes, and the timer ring 133 may have a granularity of hours.

In operation, the timer management component 106 provides an interface for receiving timer-related commands from requestors and for providing timer-related notifications to requestors. To illustrate, for software-based requestors, the processor 102 may provide an application programming interface (API) for requestors to issue timer commands and receive timer notifications. The timer commands may include, for example a timer instantiation request (that is, a request to create a new timer), a request for early termination of a timer, a request to reset or recharge a timer, a timer release confirmation message to release a timer that has expired, and the like. The timer commands may include various parameters, such as a requested timer ID for a timer to be instantiated, an initial time span for a timer to be instantiated, various conditional parameters for a timer to be instantiated, and the like. The timer notifications provided by the timer management component 106 can include, for example, a notification acknowledging instantiation of a timer, a notification that a request for a timer has failed, a timer expiration notification that a timer has expired, and the like. The timer notifications may be associated with a timer ID and may pass various parameters or other information. Further, as described herein, timer notifications may spur subsequent responses from a receiving timer owner, such as a timer release confirmation message from a timer owner in response to receiving and acknowledging a timer expiration notification for an expired timer of the timer owner.

Figure 2:
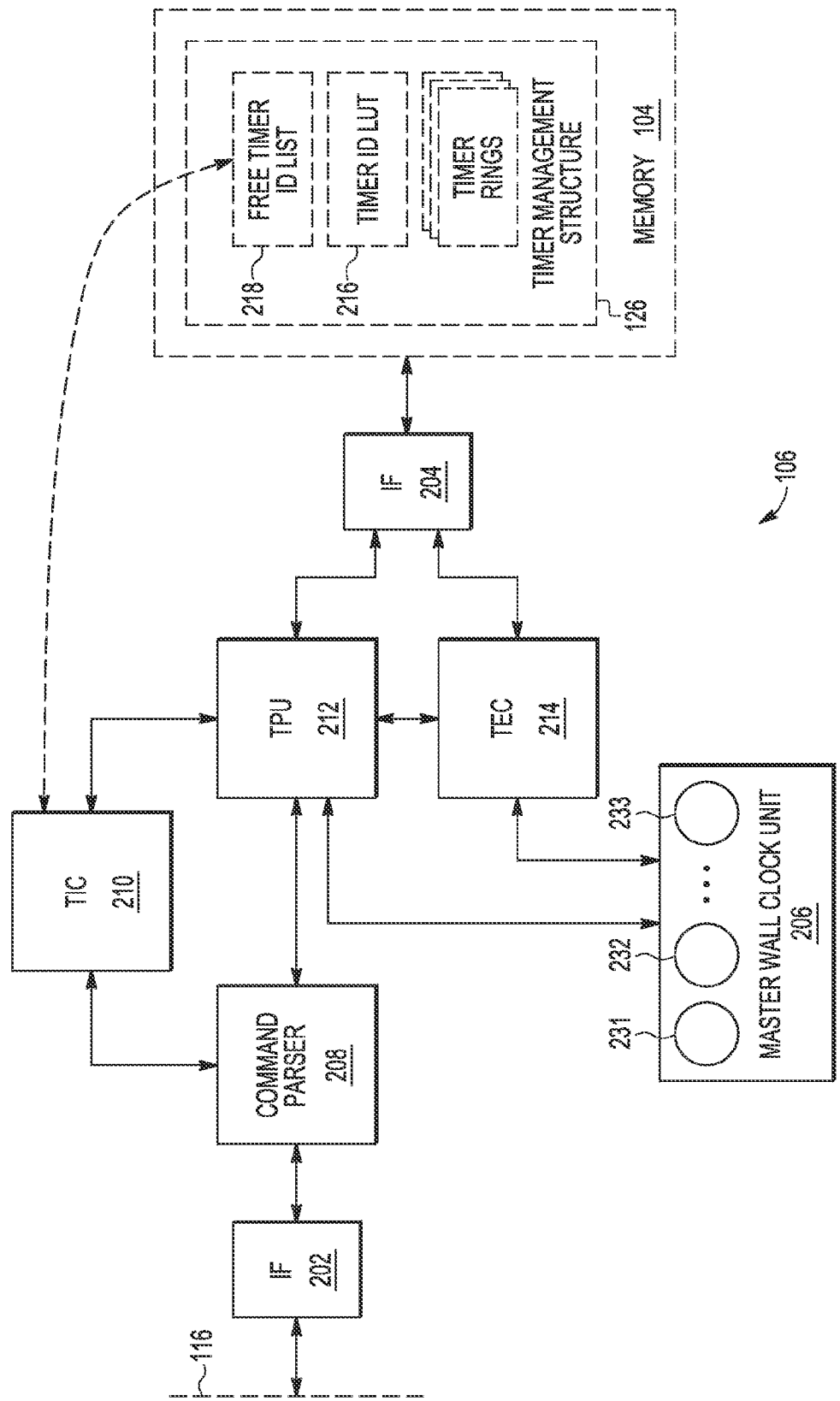
FIG. 2 is a block diagram illustrating a time management component of the processing system of FIG. 1 in accordance with at least one embodiment of the present invention.

FIG. 2 illustrates an example implementation of the timer management component 106 in accordance with at least one embodiment. In the depicted example, the timer management component 106 includes an interface 202 to the system interconnect 116, an interface 204 to the memory 104, a master wall clock unit 206, a command parser 208, a timer ID control (TIC) component 210, a timer processing unit (TPU) 212, and a timer expiration control (TEC) component 214. The command parser 208 is coupled to the interface 202 and is configured to parse timer commands and responses received from the requestors of the processing system 100 via the system interconnect 116, as well as to format timer notifications from the TPU and TIC component 210 for broadcast or other transmission to the requestors via the system interconnect 116.

The TIC component 210 is coupled to the command parser 208 and the TPU 212 and is configured to manage the timer ID allocation process for the timer management component 106. To this end, the TIC component 210 may maintain a set of one or more tables, lists, or other data structures in the memory 104 or other storage element of the processing system 100. These data structures can include, for example, a timer ID look up table (LUT) 216, with each entry of the timer ID LUT 216 associated with a corresponding timer ID and indicating whether the corresponding timer ID is currently in use, or active, and if so, providing information that links the timer ID of an active timer to its timer owner so that the timer management component 106 can translate between timer ID and requestor ID. Alternatively, as described in greater detail below, the timer management component 106 may facilitate the use of a thread ID, or other ID unique to the requestor, as the timer ID (or the basis of a timer ID) for a timer instantiated by the requestor. In such instances, a table linking each timer ID to its timer owner may not be needed as the translation may be obtained directly from the timer ID. Instead, the TIC component 210 may implement a free timer ID list 218 that maintains a list of timer IDs that are not currently active and thus available for allocation or, alternatively, timer IDs that are currently active and thus not available for activation.

The TPU 212 is coupled to the command parser 208, the TIC component 210, the TEC component 214, and the IF 204 and is configured to manage the processing of incoming timer commands from requestors, the processing of outgoing timer notifications to the requestors, as well as the instantiation, deletion, modification and other requestor-initiated queries for timers within the timer management structure 126 via memory access requests performed via the interface 204.

The master wall clock unit 206 is configured to provide the timing references used to manage the timers of the timer management structure 126. To this end, the master wall clock unit 206 includes a master wall clock (MWC) for each timer ring of the timer management structure 126, with each MWC having a time unit granularity corresponding to the time unit granularity of the associated timer ring. To illustrate, the master wall clock unit 206 may include MWCs 231, 232, 233 for timer rings 131, 132, 133, respectively. Each MWC signals clock ticks at a frequency correlated to the time unit granularity of its corresponding timer ring. To illustrate, if the timer ring 131 has an hour time unit granularity, the MWC 231 would issue a clock tick every hour, whereas if the timer ring 133 has a microsecond granularity, then the MWC 233 would issue a clock tick every microsecond. The MWCs of the master wall clock unit 206 may be implemented as independent clock sources (e.g., separate phase locked loops (PLLs)), or they may be implemented from the same reference clock source via separate frequency dividers, counter structures, or other mechanisms for providing clocks of different periods from the same base clock.

The TEC component 214 is coupled to the master wall clock unit 206, the TPU 212, and the interface 204, and is configured to manage, in conjunction with the master wall clock unit 206, the process of sequencing through the entries of timer rings of the timer management structure 126 responsive to the clock ticks of corresponding MWCs of the master wall clock unit 206, as well as managing the process of expiring the timers contained in the currently indexed entries of the timer rings.

Figure 3:
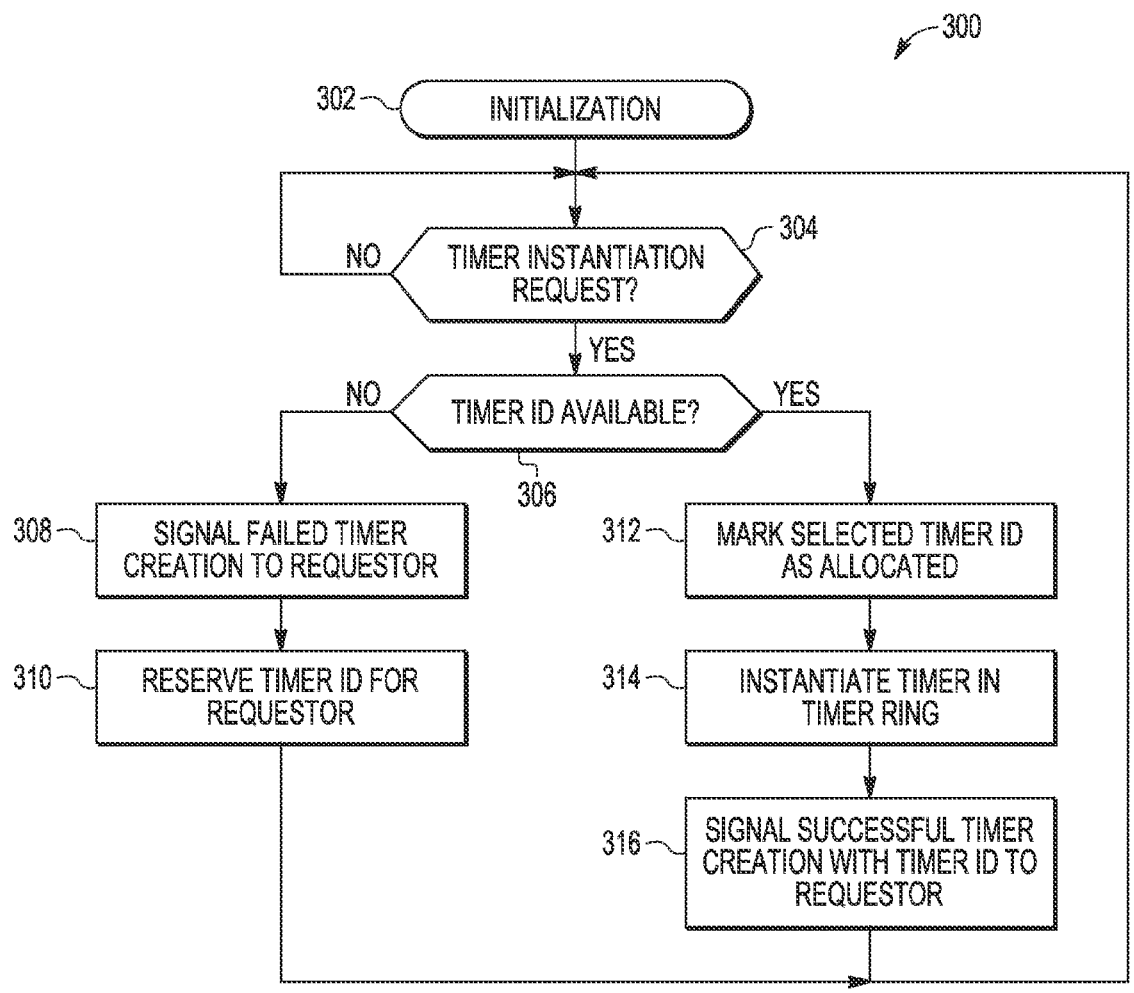
FIG. 3 is a flow diagram illustrating a method for allocating timer identifiers (IDs) in a processing system in accordance with at least one embodiment of the present invention.
Figure 4:
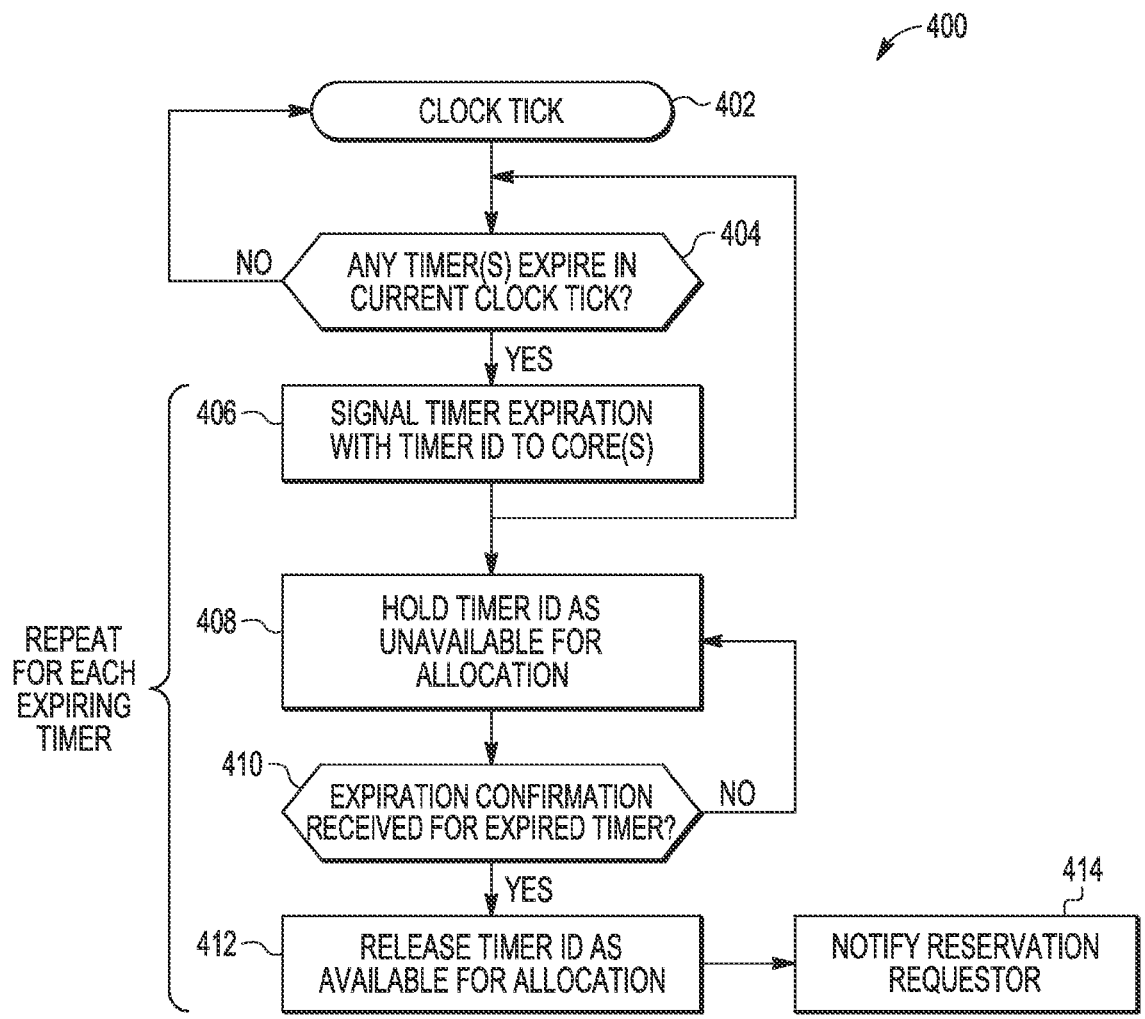
FIG. 4 is a flow diagram illustrating a method for managing timer IDs after timer expiration in a processing system in accordance with at least one embodiment of the present invention.
Figure 5:
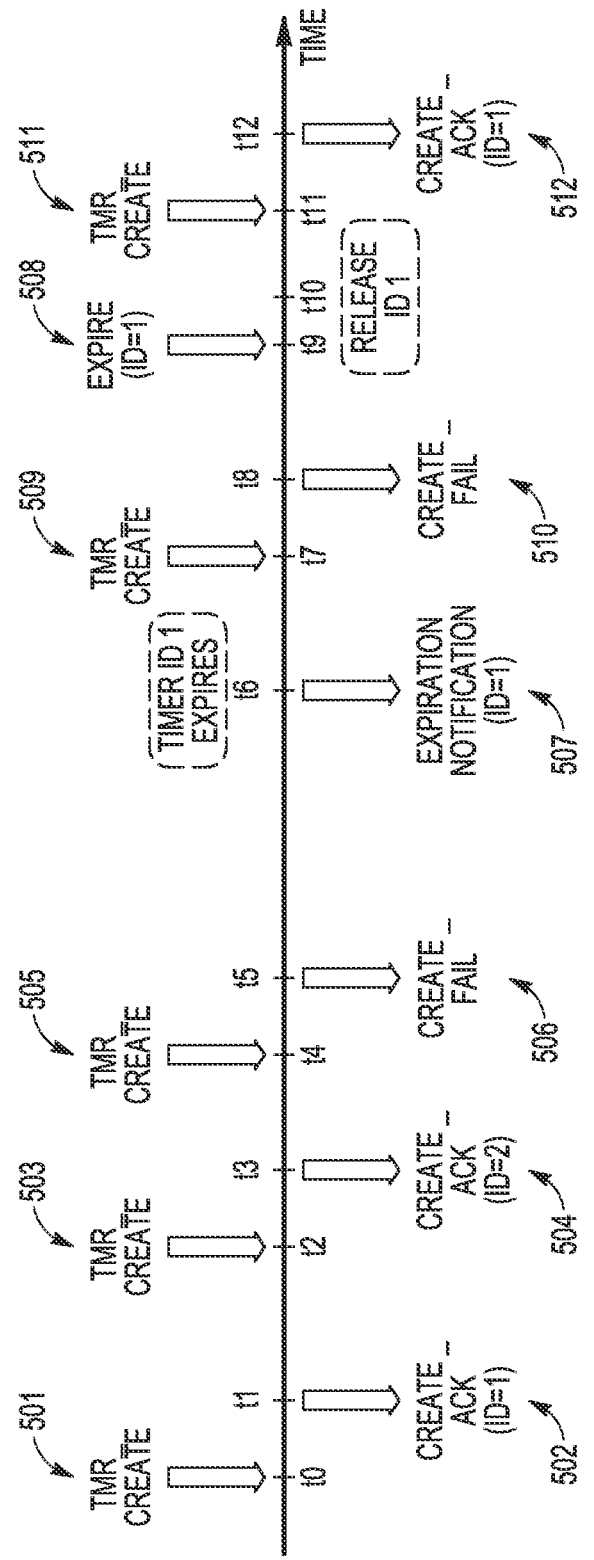
FIG. 5 is a diagram illustrating an example timer management scenario in a processing system based on the methods of FIGS. 3 and 4 in accordance with at least one embodiment of the present invention.

FIGS. 3-5 together illustrate processes of instantiating timers, expiring timers, and managing the allocation, deallocation, and reallocation of timer IDs accordingly in the processing system 100. For ease of illustration, these processes are described in the example context of the implementation of the timer management component 106 as described above with reference to FIG. 2.

FIG. 3 depicts a method 300 for allocating timer IDs responsive to timer creation requests from requestors of the processing system 100 in accordance with at least one embodiment of the present invention. Initial block 302 of method 300 represents the initialization process performed by the processing system 100 upon entering a powered-on or active state, such as after a power-on reset. As part of this initialization process, the master wall clocks of the master wall clock unit 206 are initialized, the TEC component 214 sets the pointers of the timer rings of the timer management structure 126 to their initial positions (e.g., entry 0), and the TIC component 210 initializes its timer-related tables or lists so that all timer IDs are recognized as available for allocation at this point.

After initialization, at block 304 the command parser 208 monitors the signaling on the system interconnect 116 for timer instantiation requests from requestors. In response to receiving a timer instantiation request, at block 306 the TIC component 210 determines whether a timer ID is available for allocation to the requested timer. In some embodiments, timer IDs are allocated to timers at will or independent of an identifier or ID request of the requestor. In such instances, the TIC component 210 determines whether any timer IDs remain unallocated. The TIC component 210 may identify available timer IDs via, for example, the free timer ID list 218. In other embodiments, the requestor may specify a particular timer ID to be assigned to the requested timer, such as by specifying the use of a thread ID or other ID unique to the requestor as the timer ID. In such instances, the TIC component 210 may determine whether the specified timer ID is available by, for example, performing a lookup into the timer ID LUT 216 using the specified timer ID.

In the event that a timer ID is unavailable for allocation or that the specified timer ID is already in use, at block 308 the TIC component 210 signals to the TPU 212 that timer ID allocation could not be successfully performed, and in response the TPU 212 sends a timer instantiation failure notification to the requestor, either as a broadcast message that references the requestors timer creation request in some manner, or as a unicast message directly to the requestor. If the requestor remains intent on instantiating a timer, or instantiating a timer with a specific timer ID, the requestor then may attempt the timer instantiation again by submitting another timer instantiation request after a delay, which may be specified, quasi-random, or specific to the requestor.

However, rather than require a requestor to reattempt timer instantiation at periodic intervals and thus potentially flood the timer management component 106 with speculative timer instantiation requests, in some embodiments the TIC component 210 implements a reservation facility whereby a requestor may specify an intent to reserve a particular timer ID for use when the timer ID next becomes available. The requestor may specify this intent via, for example, a parameter in the original timer instantiation request, or the requestor may send a separate reservation request in response to receiving the initial timer instantiation failure notification. In response to indication that the requestor intends to reserve the timer ID, the TIC component 210 may mark the reserved status of the timer ID, such as by recording the thread ID of the requestor in a reservation field of the entry of the timer ID LUT 216, or by maintaining a separate list or table of reserved timer IDs. In some embodiments, the TIC component 210 may string reservations such that a timer ID may be reserved by multiple requestors in sequence of their requests, or in a sequence based on priority of the request or priority of the requestor. In the event that this reservation facility is implemented by the TIC component 210, at block 310 the TIC component 210 may reserve the requested timer ID for use by the requestor when the timer ID is deallocated from the current timer using the timer ID.

Returning to decision block 306, if the requested timer ID is available (if a specific timer ID is requested) or if at least one timer ID is available for allocation (if a specific timer ID has not been requested), at block 312 the TIC component 210 marks the timer ID selected for allocation to the requested timer as allocated, or currently in use. This may include updating the entry for the selected timer ID in the timer ID LUT 216 to reference the thread ID or other ID of the requestor in a timer owner field of the entry, removing the timer ID from the free timer ID list 218, or adding the timer ID to an allocated timer ID list. Further, at block 314 the TIC component 210 signals the allocated timer ID to the TPU 212 and, in response, the TPU 212 instantiates the requested timer with the signaled timer ID in the timer management structure 126. An example process for instantiating a timer in the timer management structure 126 is described in greater detail below with reference to FIGS. 6-8.

Assuming the timer is successfully instantiated in the timer management structure 126, at block 316 the TPU 212 signals successful timer creation to the requestor via an acknowledgement notification sent by the command parser 208 via the system interconnect 116. This notification may include, for example, a field containing an identifier of the requestor so that the requestor may identify the notification as being directed to it, as well as a field containing the allocated timer ID.

FIG. 4 depicts a method 400 for managing timer IDs responsive to timer expirations in the processing system 100 in accordance with at least one embodiment of the present invention. The method 400 is described in the example context of a particular one of the timer rings of the timer management structure 126, and this same method may be performed in parallel for the other timer rings within the timer management structure 126.

As described in greater detail herein, each timer ring comprises a ring of entries, with each entry storing a linked list or other data structure that identifies zero or more timers set to expire at a time period associated with the entry. When the timer ring is initialized, a clock tick pointer is set to point to an initial entry (e.g., entry 0) of the timer ring, and with each clock tick of the MWC associated with the timer, the clock tick pointer is shifted to the next entry in a specified sequence in the ring of entries. The entry currently pointed to by the clock tick pointer is referred to herein as the "current entry." Thus, for each clock tick of the MWC at block 402, the clock tick pointer shifts to the next entry and at block 404 the TEC component 214 accesses the current entry to ascertain whether any timers are represented in the data structure stored in the current entry; that is, whether any timers are set to expire in the current clock tick of the master clock. If not, the TEC component 214 waits for the next clock tick to repeat the process of block 404 again for the next entry of the timer ring.

In the event there are one or more timers expiring in the current clock tick, at block 406 the TEC component 214 selects the first timer record in the data structure stored in the current entry of the timer ring and signals the expiration of this selected timer to the TPU 212. The TPU 212 then broadcasts a timer expiration notification over the system interconnect 116 via the command parser 208 (or other dedicated interface for timer expiration notification purposes). In some embodiments, this timer expiration notification includes a reference to the timer owner of the expired timer. To illustrate, the TIC component 210 may perform a lookup into the timer ID LUT 216 using the timer ID of the expired timer to identify the thread ID of the timer owner for the expired timer, and the timer expiration notification may include one or both of the timer ID and the thread ID of the timer owner so that the timer owner may identify the broadcast timer expiration notification as being directed to it.

There may be relatively long signal pathways, or multiple layers of signal pathways, in the one or more system interconnects 116 that connect the timer management component 106 to the timer owner, and additional timer commands may be received during the considerable time that the timer expiration notification may be in flight. Thus, if the timer ID is associated with a one-shot timer and is released for reallocation immediately after timer expiration or immediately after the timer expiration notification has been sent, it is possible that the timer ID could be reallocated to another requestor before the previous timer owner has been made aware of the timer expiration and consented to release of the timer originally associated with the timer ID. If the timer ID is associated with a periodic timer is reset again after timer expiration without further confirmation from the timer owner, it is possible that the timer owner did not need this iteration of the periodic timer, and thus the subsequent timer expiration notifications from such periodic timers could flood the signal pathways.

To avoid such coherency issues and expiration flood issues, in at least one embodiment the TIC component 210 implements a handshake protocol to ensure that the original timer owner has released the timer for reallocation (for one-shot timers) or for resetting (for periodic timers) in response to its expiration before the timer ID of the timer may be reallocated to another timer. To this end, at block 408 the TIC component 210 holds the timer ID as not available for allocation or resetting, or otherwise maintains the timer ID in an allocated/non-resettable state following the issuance of the timer expiration notification at block 406 and then monitors for timer release confirmation message from the timer owner at block 410. The timer release confirmation message acts as confirmation by the timer owner that the timer owner has received the timer expiration notification and has released its claim on the timer (for one-shot timers) or has released the timer so that it may be reset to expire again after a specified period. Thus, in response to receiving the timer expiration notification, if the timer owner is prepared to release the timer, the timer owner sends a timer release confirmation message to the timer management component 106, with the timer ID referenced in the timer release confirmation message. However, if the timer owner is not yet prepared to release the timer for reallocation or recharging, the timer owner may refrain from issuing the timer release confirmation message, and instead issue other timer commands for the timer. Because the timer ID has been held from being deallocated/recharged at block 408, the timer ID and corresponding timer are still associated with the current timer owner and thus any new timer commands from the timer owner are limited to modification of the timer instantiated by the timer owner, rather than modifying a new timer instantiated by another requestor.

In the event that a timer release confirmation message is received from the timer owner, at block 412 the TPU 212 signals the release of the timer ID to the TIC component 210, which then releases the hold on the timer ID. For a one-shot timer, this release may include, for example, adding the timer ID back to the free timer ID list 218 or by marking the timer ID as unallocated in the timer ID LUT 216, so as to make the timer ID available for reallocation to another timer requestor. Further, in embodiments whereby the TIC component 210 provides the reservation facility, at block 414 the TIC component 210 may honor a reservation made for the released timer ID at an iteration of block 310 of method 300 of FIG. 3. In some embodiments, this may include the TIC component 210 initiating the automatic instantiation of a timer with the reserved timer ID on behalf of the reserving requestor in response to the timer ID being deallocated at block 412. In other embodiments, the TIC component 210 may send an availability notification via the TPU 212 and command parser 208 to the reserving requestor, and the requestor may respond to this notification by either releasing the reservation through a reservation release command or by requesting instantiation of a timer with the timer ID through a timer instantiation request. For a periodic timer, the release by the TPU 212 may include, for example, resetting or recharging the timer so as to expire again after the corresponding time lapse.

As shown, after the TPU 212 has initiated transmission of the timer expiration notification for the timer selected at block 404, the TEC component 214 may select the next timer in the data structure in the current entry of the timer ring (if there is another timer yet to be processed) and the process of blocks 406, 408, 410, and 412 may be repeated for this next timer, and so forth, until all of the expiring timers have been processed, at which point the method 400 returns to block 402 to await the next clock tick.

FIG. 5 illustrates an example scenario using the methods 300, 400 in an example simplified context whereby the TIC component 210 maintains two timer IDs (ID 1 and ID 2) for the timer management component 106. For purposes of this scenario, both timer IDs are initially available for allocation. At time t0, a first requestor issues a timer instantiation request ("TMR_CREATE") 501 to instantiate a timer. In response to this command, the TIC component 210 verifies that timer ID 1 is available and thus the TPU 212 instantiates the requested timer with timer ID 1. At time t1 a timer instantiation confirmation notification ("CREATE_ACK") 502 is sent to the first requestor. Similarly, at time t2 a second requestor issues a timer instantiation request 503 to instantiate a timer. In response to this command, the TIC component 210 verifies that timer ID 2 is available and thus the TPU 212 instantiates the requested timer with timer ID 2. At time t3 a timer instantiation confirmation notification 504 is sent to the second requestor. At time t4, a third requestor issues a timer instantiation request 505 to instantiate a timer. However, as both timer IDs 1 and 2 are allocated at this point, no timer IDs are available for allocation and thus the TPU 212 signals a timer instantiation failure notification ("CREATE_FAIL") 506 at time t5. For this example, it is assumed that a reservation facility is unavailable.

Subsequently, the timer having timer ID 1 expires at time t6, and in response the TEC component 214 initiates the broadcast of a timer expiration notification 507 having timer ID 1 to all of the requestors. Because of the transmission delay, the timer expiration notification 507 does not reach the first requestor until time t9, at which point the first requestor releases its claim on the timer ID 1 by issuing a timer release confirmation message 508. In the time period between the issuance of the timer expiration notification 507 and the receipt of the timer release confirmation message 508, the third requestor again attempts to instantiate a timer by issuing a timer instantiation command 509 at time t7. However, the timer ID 1 is maintained as unavailable for allocation at this point because the timer release confirmation message 508 has not yet been received by the timer management component 106, and thus the TIC component 210 signals, through the TPU 212, a timer instantiation failure notification 510 at time t8.

In response to receiving the timer release confirmation message 508 at time t10, the TIC component 210 releases the timer ID 1 so that it may be deallocated from the timer for the first requestor. Accordingly, when the third requestor attempts to instantiate a timer for a third time by issuing a timer instantiation request 511 at time t11, timer ID 1 is available for allocation and thus the TPU 212 successfully instantiates a timer for the third requestor and sends a timer instantiation confirmation notification 512 with the timer ID 1 to the third requestor at time t12.

Figure 6:
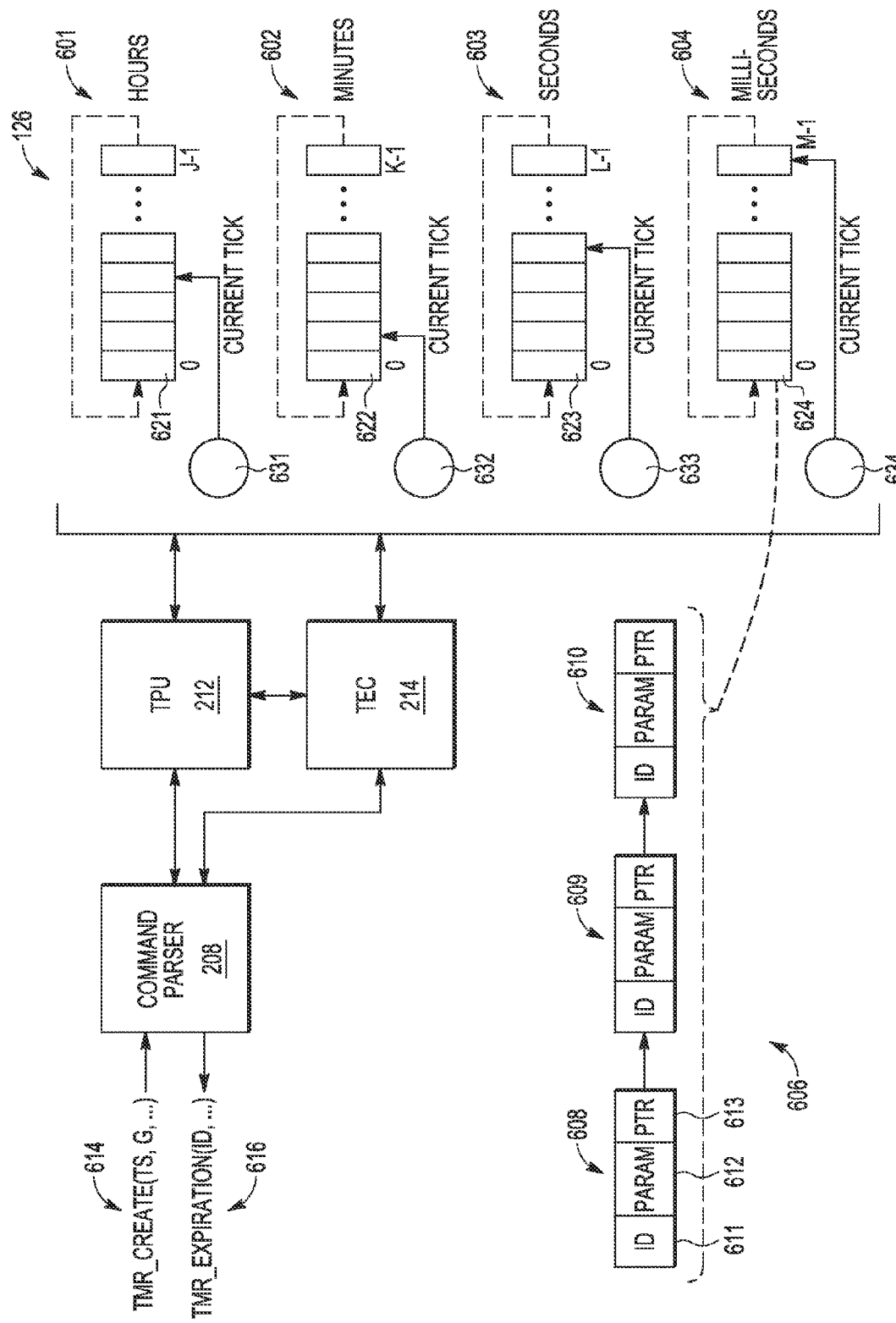
FIG. 6 is a diagram illustrating a granularity-based timer management structure of a processing system in accordance with at least one embodiment of the present invention.

FIG. 6 illustrates an example implementation of the timer management structure 126 based on time unit granularities in conjunction with the command parser 208, the TPU 212, the TEC component 214, and the master wall clock unit 206 in accordance with at least one embodiment of the present invention. In at least one embodiment, the timer management structure 126 comprises a plurality of timer rings, each timer ring comprising a ring of entries and being associated with a different time unit, or time unit granularity. To illustrate, in the depicted example, the timer management structure 126 includes four timer rings: a timer ring 601 associated with an hour time unit granularity and having a ring of J entries 621; a timer ring 602 associated with a minute time unit granularity and having a ring of K entries 622; a timer ring 603 associated with a second time unit granularity and having a ring of L entries 623; and a timer ring 604 associated with a millisecond time unit granularity and having a ring of M entries 624, where J, K, L, and M are integers greater than 1 and which may be the same number or different numbers. It should be noted that the number of timer rings and their respective time unit granularities in FIG. 6 are for illustrative purposes only and are non-limiting. In other embodiments, more or fewer timer rings may be used, and different time unit granularities, or different combinations thereof, may be used.

Each timer ring is associated with a different MWC of the master wall clock unit 206 that signals clock ticks at intervals corresponding to the time unit granularity of the timer ring. To illustrate, a MWC 631 provides clock ticks at 1 hour intervals for the timer ring 601, a MWC 632 provides clock ticks at 1 minute intervals for the timer ring 602, a MWC 633 provides clock ticks at 1 second intervals for the timer ring 603, and the MWC 634 provides clock ticks at 1 millisecond intervals for the timer ring 604. The TEC component 214 maintains a "current tick" pointer for each timer ring. The counter tick pointer is initialized to point to the initial entry (entry 0) of the corresponding timer ring, and with each clock tick of the corresponding MWC, the TEC component 214 shifts the counter tick pointer to point to the next entry in the timer ring. As the entries are logically arranged in a ring, when the counter tick pointer is at the last entry in the linear order of entries, the next clock tick triggers the TEC component 214 to shift the counter tick pointer back to the initial entry again.

In this manner, the TEC component 214 cycles the counter tick pointer through the entries of the timer ring responsive to the clock ticks of the corresponding MWC, and such that the span of time between the current time and a subsequent entry in the timer ring expressed in the time unit of the timer ring is represented by the number of entries between the current entry (that is, the entry currently pointed to by the counter tick pointer) and the subsequent entry. To illustrate, an entry 623 of the timer ring 603 that is ten entries ahead of the current entry 623 in the timer ring 603 may be said to represent a point in time ten seconds from the current time.

Each entry of a timer ring is configured to store records of any timers that are set to expire during the clock tick period associated with the entry. These records may be stored in any of a variety of data structures or combinations of data structures. In the depicted example, each entry 624 of the timer ring 604 comprises a linked list 606, with each record of the linked list 606 representing the record of a corresponding timer set to expire in the clock tick period associated with the entry. To illustrate, in the depicted example the linked list 606 includes three records 608, 609, 610 representing three timers, with each record having, for example, an ID field 611, a parameter field 612, and a next record pointer field 613. The ID field 611 is to store a timer ID of the corresponding timer. The parameter field 612 is to store various parameters for the timer, such as the thread ID of the timer owner for the timer, timer priority or expiration notification priority, conditional parameters that identify under what conditions the timer is, for example, to expire or be prevented from expiring. The next record pointer field 613 is to store a pointer to the next entry in the linked list. The benefit of a linked list is that its storage requirements are proportional to the number of active timers represented by records within the linked list. However, in other embodiments, the timers associated with a timer ring entry may be stored in a different type of data structure, such as a table or other structure with a fixed number of entries.

Figure 7:
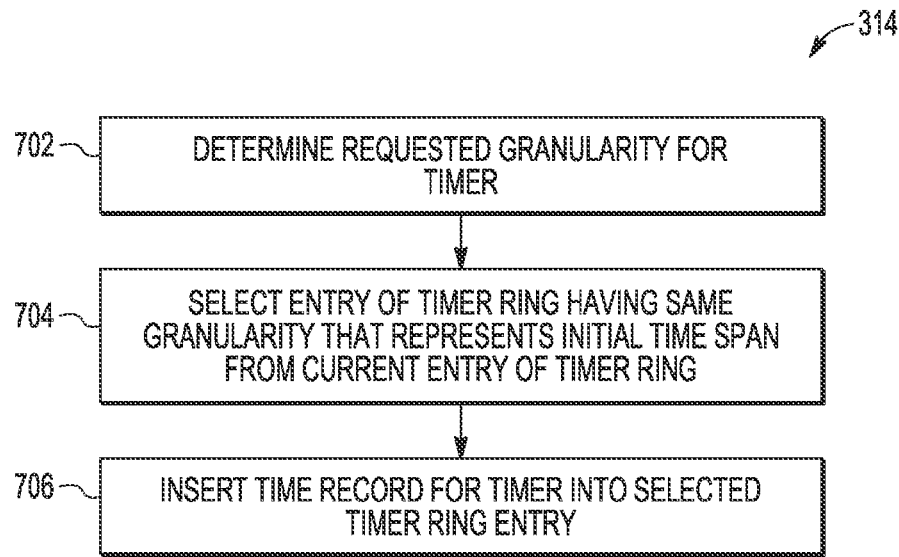
FIG. 7 is a flow diagram illustrating a method for instantiating a timer in the granularity-based timer management structure of FIG. 6 in accordance with at least one embodiment of the present invention.
Figure 8:
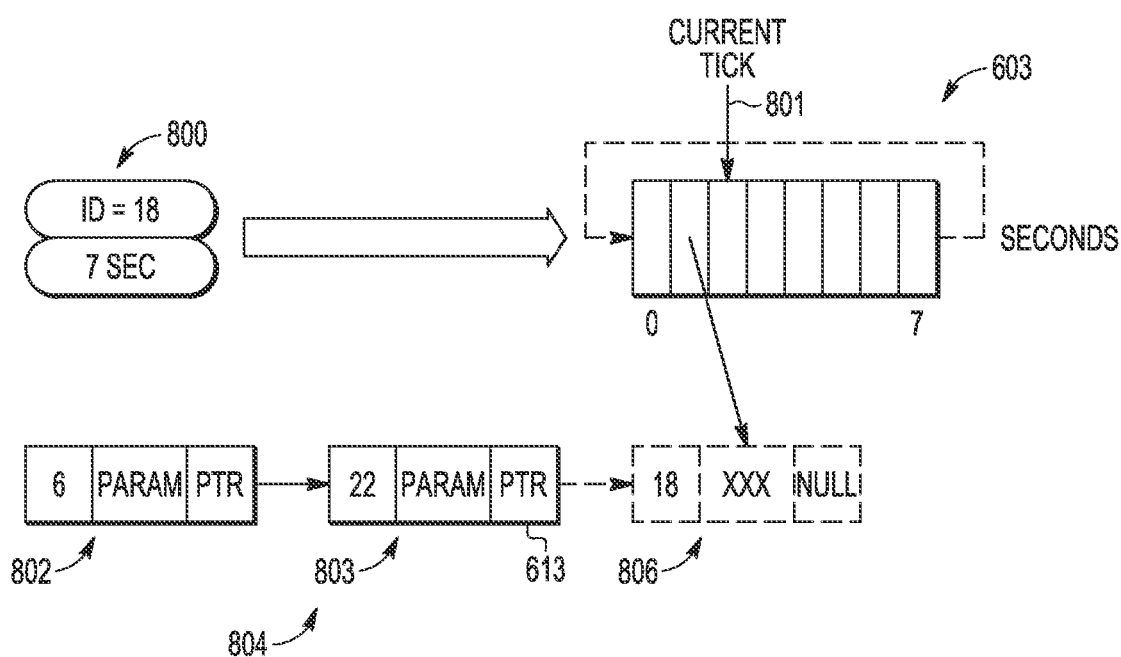
FIG. 8 is a diagram illustrating an example timer instantiation scenario based on the method of FIG. 7 in accordance with at least one embodiment of the present invention.
Figure 9:
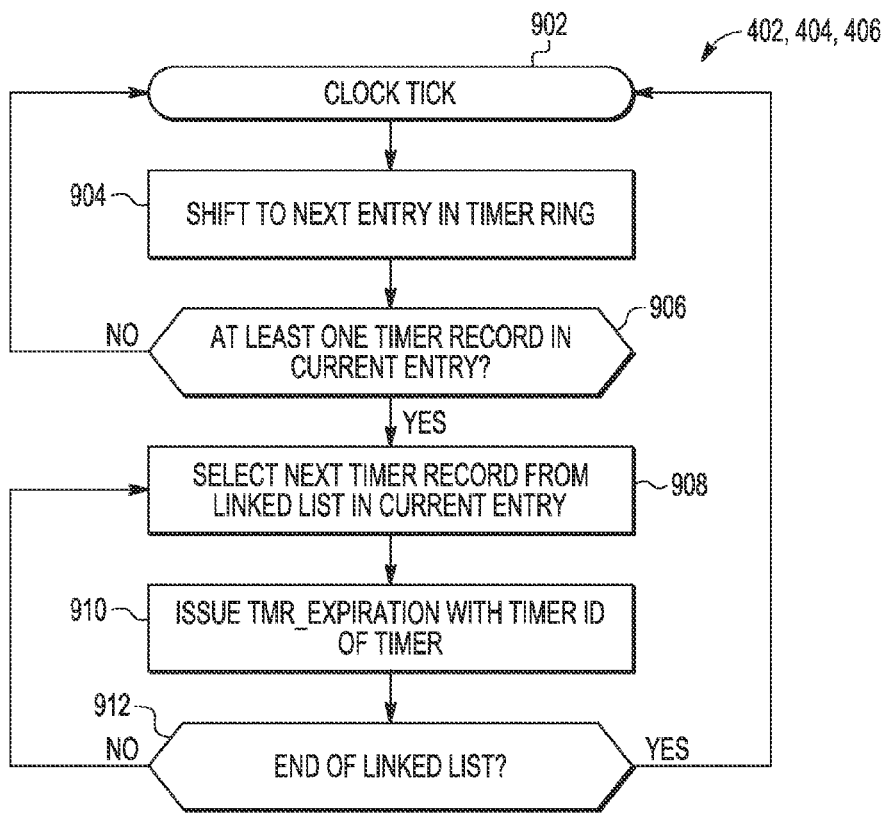
FIG. 9 is a flow diagram illustrating a method for managing the granularity-based timer management structure of FIG. 6 in accordance with at least one embodiment of the present invention.
Figure 10:
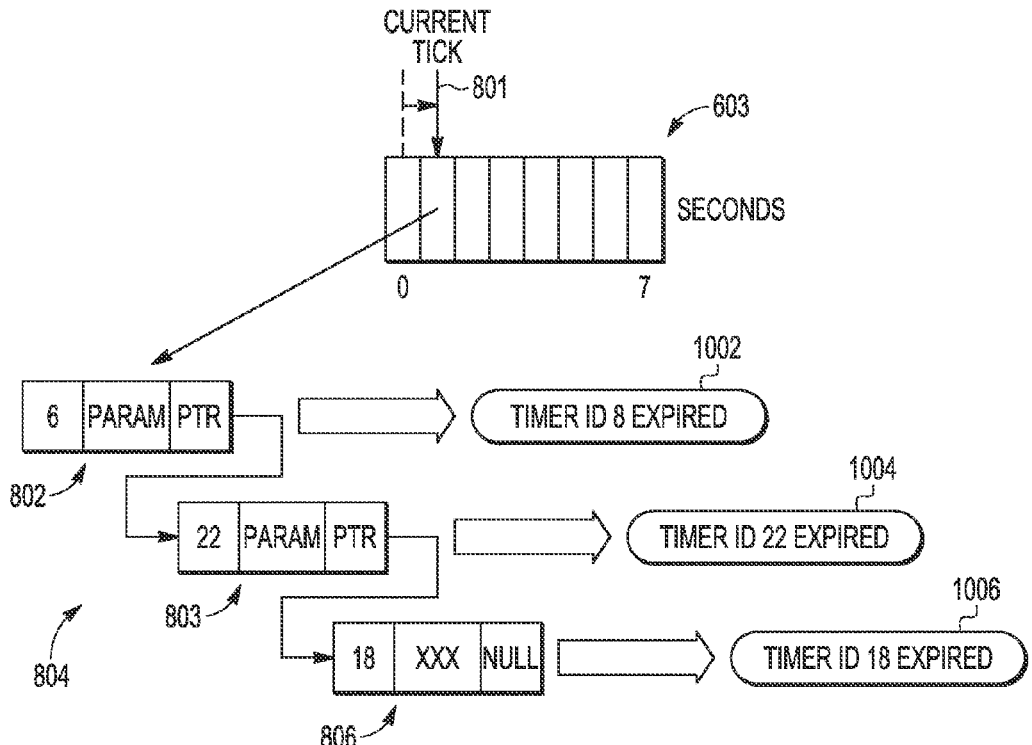
FIG. 10 is a diagram illustrating an example timer expiration scenario based on the method of FIG. 9 in accordance with at least one embodiment of the present invention.

FIGS. 7-10 illustrate processes for instantiating a timer and managing timer expiration in the implementation of the timer management structure 126 depicted in FIG. 6. In particular, FIG. 7 illustrates an example implementation of the timer instantiation process of block 317 of method 300 of FIG. 3 and FIG. 8 provides an example scenario of an implementation of this process. Similarly, FIG. 9 illustrates an example implementation of the process of blocks 402, 404, and 406 of method 400 of FIG. 4 and FIG. 10 provides an example scenario of an implementation of this process.

Referring now to FIG. 7, the timer instantiation process in the context of the timer management structure 126 of FIG. 6 is initiated following receipt of a timer instantiation command 614 (FIG. 6) via the command parser 208 and successful allocation of a timer ID to the requested timer by the TIC component 210. As noted, the timer management structure 126 contains timer rings of different time unit granularities, and thus at block 702 the TPU 212 determines the time unit granularity to be implemented for the requested timer. In one embodiment, the timer instantiation command 614 includes an explicit indication of the requested time unit granularity.

For example, the API or other command interface provided by the timer management component 106 for timer commands may specify a granularity parameter to be supplied as part of the timer instantiation command 614. To illustrate, the timer instantiation command may have the format TMR_CREATE(time_span, gr, . . . ), where "gr" represents the granularity and "time_span" represents the time span of the timer in terms of number of clock ticks at the specified granularity. Thus, a timer command TMR_CREATE(20, minute, . . . ) would specify that the timer is to have a minute time unit granularity and set to expire 20 minutes from the current time, whereas a timer command TMR_CREATE(1200, seconds, . . . ) would specify that the timer is to have a second time unit granularity and set to expire 1200 seconds from the current time. Note that both examples provide for a timer with the same time span duration, but at different granularities.

In other embodiments, the granularity of the requested timer may be inferred from information other than the timer instantiation command itself. To illustrate, the requestors may have been divided into different classifications of requestors, and with each classification having a default granularity for its instantiated timers. As another example, timer management component 106 may be configured to select a granularity for a requested timer based on current conditions in the processor 102, such as based on the processor power state, the distribution of timers among the different timer rings 601-604, and the like.

With the granularity determined, at block 704 the TPU 212 determines which entry of the selected timer ring the timer is to be instantiated in. As explained above, the TEC component 214 maintains a counter tick pointer that points to an entry associated with the current clock tick period (that is, the current entry), and each entry after the current entry in sequence order represents an additional clock tick of the MWC associated with the timer ring. Thus, the entry to contain the requested timer is the entry that is X entries after the current entry in the sequence order, where X represents the number of clock ticks in the initial time span of the timer. To illustrate, assume that the timer management component 106 receives a timer instantiation command requesting a timer set to expire in 20 minutes. Thus, the timer has a granularity of minute time units and a time span of 20 clock ticks at a one-minute clock tick period. Accordingly, if the current entry of the timer ring 602 is entry 1, then the timer would be instantiated in entry 21 (which is 20 entries "away" from entry 1).

With the particular entry of the selected timer ring identified, at block 706 the TPU 212 instantiates the requested timer by adding a timer record representing the requested timer to the identified entry. As noted above, in some embodiments each entry may store a linked list of timers set to expire at the clock tick period associated with the entry. Accordingly, the process of adding the timer record may include appending an entry to the end of the linked list stored in the entry, or if the timer is the first timer to be added to the timer ring entry, creating a new linked list with the timer record added as the first entry of the linked list.

FIG. 8 illustrates an example iteration of the process of FIG. 7. As shown, a timer 800 having a timer ID of 18 and a time span of 7 seconds is submitted for instantiation in the seconds-based timer ring 603. At the time of instantiation, the counter tick pointer 801 of the timer ring 603 points to entry 2 of the timer ring 603; that is, entry 2 is the current entry at the time of instantiation. Further, in this simplified example, the timer ring 603 has 8 entries, and thus represents a maximum initial timer span of 8 seconds. Given the position of the current entry, the TPU 212 identifies entry 1 as being 7 entries from the current entry in sequence order, and thus entry 1 is the entry that will be accessed in 7 clock ticks, or 7 seconds, from the current time.

In the depicted example, entry 1 already has two other timer records in the form of a first record 802 and a second record 803 of a linked list 804. Thus, to instantiate the timer 800, a third record 806 is appended to the linked list 804, with the next record pointer field 613 updated to point to the third record 806. The third record 806 includes the timer ID of 18 stored in the ID field 611, parameters associated with the timer 800 in the parameter field 612, and a null value stored in the next record pointer field 613 to indicate that the third record 806 is the last entry of the linked list 804.

FIG. 9 illustrates the timer expiration process performed by the timer management component in the context of the implementation of the timer management structure 126 depicted in FIG. 6. The process of FIG. 9 illustrates the timer expiration process of blocks 402, 404, and 406 of method 400 of FIG. 4 with respect to a single timer ring of the timer management structure 126, and thus this process may be replicated in parallel for the multiple timer rings of the timer management structure 126.

As described above, each timer ring is associated with a corresponding master wall clock that signals a clock tick 902 for the passage of each time unit associated with the granularity of the timer ring. The clock tick pointer of the timer ring is initialized to point to an initial entry, and with each clock tick 902 the clock tick pointer is shifted to the next entry in the timer ring at block 904. In response to this shift to the next entry, at block 906 the TEC component 214 accesses the now current entry to determine whether it contains any timer records. If not, then no timers are set to expire in the timer ring for the current clock tick period, and thus the TEC component 214 awaits the next clock tick 902.

Otherwise, if there are one or more timers in the current entry and thus set to expire in the current clock tick period, at block 908 the TEC component 214 selects a timer record stored in the current entry and at block 910 the TEC component 214 triggers the issuance of a timer expiration notification 616 (FIG. 6) for the selected timer record. As part of this process, the TEC component 214 may include the timer ID from the ID field 611 in the timer expiration notification 616, and the TEC component 214 may process the timer expiration notification 616 based on one or more parameters specified in the parameter field 612 of the timer record, such as, for example, selectively suppressing issuance of the timer expiration notification based on one or more conditions specified in the parameters of the timer record. Further, after each timer record is processed, the timer record may be deleted from the entry or, in the event that the timer ID is to be held as allocated until its release is explicitly authorized by the timer owner, the timer record may be marked as being held in an allocated state but no longer valid for expiry evaluation.

At block 912 the TEC component 214 determines whether any more unprocessed timer records remain in the current entry, and if so, the process of blocks 908, 910, and 912 may be repeated for the next timer record selected from the current entry. As noted above, in some embodiments the timer records of an entry are organized as a linked list, and the TEC component 214 may sequence through the linked list from the head entry to the tail entry, with the process of blocks 908, 910, and 912 repeated for each entry encountered in the linked list.

FIG. 10 illustrates an example iteration of the timer expiration process of FIG. 9 based on the example scenario described above with reference to FIG. 8. In that scenario, the linked list 804 having first record 802, second record 803, and third record 806 was created in entry 1 of the timer ring 603. Accordingly, as shown in FIG. 10, when the counter tick pointer 801 shifts to the entry 1, the TEC component 214 accesses the linked list 804 in the entry 1, and processes the first record 802 so as to trigger issuance of a timer expiration notification 1002 that includes the timer ID of 6. The TEC component 214 then moves to processing of the second record 803 and thus triggers issuance of a timer expiration notification 1004 that includes the timer ID of 22. The TEC component 214 then processes the third record 806 so as to trigger issuance of a timer expiration notification 1006 that includes the timer ID of 18. The post-notification timer ID hold process described above may be implemented for each of the timer expiration notifications 1002, 1004, 1006 so as to ensure that coherency is maintained for each of the timer IDs 6, 22, and 18.

In accordance with one aspect of the present disclosure a method in a processing system includes transmitting a timer expiration notification from a timer management component of a processor to one or more other components of the processor in response to expiration of a timer. The method further includes transmitting, from a component of the processor that requested instantiation of the timer, a timer release confirmation message to the timer management component in response to the timer expiration notification, the timer release confirmation message confirming that the component has released the timer. The method also includes preventing reallocation of a timer identifier (ID) associated with the timer to another timer after the expiration of the timer and until receipt of the timer release confirmation message at the timer management component.

In accordance with another aspect, a processor includes a timer management component having a first interface configured to transmit a timer expiration notification to one or more other components of the processor in response to expiration of a timer maintained by the timer management component for a component of the processor, and having a timer identifier control (TIC) component coupled to the first interface. The TIC component is configured to prevent reallocation of a timer identifier (ID) associated with the timer to another timer after the expiration of the timer and until receipt of a timer release confirmation message for the timer at the timer management component. The processor further includes the component, wherein the component is configured to transmit the timer release confirmation message to the timer management component in response to receiving the timer expiration notification, the timer release confirmation message confirming that the component has released the timer.

In accordance with yet another embodiment of the present disclosure, a method includes receiving a first timer instantiation request from a first component of a processor of the processing system and instantiating a first timer for the first component responsive to the first timer instantiation request and responsive to determining that a timer identifier (ID) is available for allocation to the first timer. The method further includes marking the timer ID as unavailable for allocation and broadcasting a timer expiration notification at a first time responsive to an expiration of the first timer, and receiving a second timer instantiation request from a second component of the processor at a second time subsequent to the first time. The method additionally includes denying allocation of the timer ID to a second timer requested by the second timer instantiation request responsive to determining the timer ID is marked as unavailable for allocation, and marking the timer ID as available for allocation to a timer responsive to receiving a timer release confirmation message from the first component at a third time subsequent to the second time, the timer release confirmation message indicating that the first component has released the first timer. The method also includes receiving a third timer instantiation request from a third component of the processor at a fourth time subsequent to the third time, and permitting allocation of the timer ID to a third timer requested by the third timer instantiation request responsive to determining the timer ID is marked as available for allocation.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a processing system, a method comprising:
    transmitting a timer expiration notification from a timer management component of a processor to one or more other components of the processor in response to expiration of a timer;
    transmitting, from a component of the processor that requested instantiation of the timer, a timer release confirmation message to the timer management component in response to the timer expiration notification, the timer release confirmation message confirming that the component of the processor has released the timer; and
    preventing reallocation of a timer identifier (ID) associated with the timer to another timer after the expiration of the timer and until receipt of the timer release confirmation message at the timer management component.

2. The method of claim 1, wherein preventing reallocation of the timer ID comprises:
    denying allocation of the timer ID for a timer instantiation request responsive to receiving, at the timer management component, the timer instantiation request between transmitting the timer expiration notification and receiving the timer release confirmation message; and
    authorizing allocation of the timer ID for a second timer instantiation request responsive to receiving, at the timer management component, the second timer instantiation request after receiving the timer release confirmation message.

3. The method of claim 1, further comprising:
    receiving, at the timer management component, a timer instantiation request from the component of the processor, the timer instantiation request requesting allocation of a specified timer ID, the specified timer ID comprising the timer ID associated with the timer; and
    instantiating the timer responsive to the timer instantiation request and responsive to determining that the specified timer ID is not currently allocated to another timer.

4. The method of claim 3, wherein:
    the specified timer ID comprises an ID unique to the component of the processor.

5. The method of claim 3, wherein instantiating the timer comprises:
    determining a time unit granularity for the timer;
    selecting a timer ring of a plurality of timer rings for the timer based on the time unit granularity; and
    instantiating the timer in a selected entry of the selected timer ring based on an entry currently accessed in the selected timer ring and based on an initial time span of the timer.

6. The method of claim 5, wherein transmitting the timer expiration notification from a timer management component comprises:
    transmitting the timer expiration notification responsive to a current clock tick pointer shifting to the selected entry in response to a clock tick from a clock having the time unit granularity.

7. The method of claim 5, wherein instantiating the timer in the selected entry comprises:
    appending a timer record to an end of a linked list associated with the selected entry, the timer record representing the timer.

8. A processor comprising:
    a timer management component comprising:
        a first interface configured to transmit a timer expiration notification to one or more other components of the processor in response to expiration of a timer maintained by the timer management component for a component of the processor; and
        a timer identifier control (TIC) component coupled to the first interface, the TIC component configured to prevent reallocation of a timer identifier (ID) associated with the timer to another timer after the expiration of the timer and until receipt of a timer release confirmation message for the timer at the timer management component; and the component of the processor, wherein the component of the processor is configured to transmit the timer release confirmation message to the timer management component in response to receiving the timer expiration notification, the timer release confirmation message confirming that the component of the processor has released the timer.

9. The processor of claim 8, wherein the TIC component is configured to prevent reallocation of the timer ID by denying allocation of the timer ID for a first timer instantiation request responsive to receiving, at the timer management component, the first timer instantiation request between transmitting the timer expiration notification and receiving the timer release confirmation message.

10. The processor of claim 8, wherein the TIC component further is configured to prevent reallocation of the timer ID by authorizing allocation of the timer ID for a second timer instantiation request responsive to receiving, at the timer management component, the second timer instantiation request after receiving the timer release confirmation message.

11. The processor of claim 8, wherein:
the first interface further is configured to receive a timer instantiation request from the component of the processor, the timer instantiation request requesting allocation of a specified timer ID, the specified timer ID comprising the timer ID associated with the timer; and
the timer management component further is configured to instantiate the timer responsive to the timer instantiation request and responsive to determining that the specified timer ID is not currently allocated to another timer.

12. The processor of claim 11, wherein:
the specified timer ID comprises an ID unique to the component.

13. The processor of claim 11, wherein the timer management component further comprises:
a second interface coupleable to a memory; and
a timer processing unit coupled to the second interface and configured to determine a time unit granularity for the timer, select for the timer a timer ring of a plurality of timer rings implemented in the memory based on the time unit granularity, and instantiate the timer in a selected entry of the selected timer ring based on an entry currently accessed in the selected timer ring and based on an initial time span of the timer.

14. The processor of claim 13, wherein the timer management component further comprises:
a timer expiration control (TEC) component coupled to the first interface and configured to initiate transmission of the timer expiration notification responsive to a current clock tick pointer shifting to the selected entry in response to a clock tick from a clock having the time unit granularity.

15. The processor of claim 13, wherein:
the timer processing unit is configured to instantiate the timer in the selected entry by appending a timer record to an end of a linked list associated with the selected entry, the timer record representing the timer.

16. In a processing system, a method comprising:
receiving a first timer instantiation request from a first component of a processor of the processing system;
instantiating a first timer for the first component of the processor responsive to the first timer instantiation request and responsive to determining that a timer identifier (ID) is available for allocation to the first timer;
marking the timer ID as unavailable for allocation and broadcasting a timer expiration notification at a first time responsive to an expiration of the first timer;
receiving a second timer instantiation request from a second component of the processor at a second time subsequent to the first time;
denying allocation of the timer ID to a second timer requested by the second timer instantiation request responsive to determining the timer ID is marked as unavailable for allocation;
marking the timer ID as available for allocation to a timer responsive to receiving a timer release confirmation message from the first component of the processor at a third time subsequent to the second time, the timer release confirmation message indicating that the first component of the processor has released the first timer;
receiving a third timer instantiation request from a third component of the processor at a fourth time subsequent to the third time; and
permitting allocation of the timer ID to a third timer requested by the third timer instantiation request responsive to determining the timer ID is marked as available for allocation.

17. The method of claim 16, wherein receiving the second timer instantiation request comprises:
receiving the second timer instantiation request with a request for a specified timer ID, the specified timer ID comprising the timer ID.

18. The method of claim 17, wherein the specified timer ID is based on an identifier unique to the first component of the processor.

19. The method of claim 17, wherein:
marking the timer ID as unavailable for allocation comprises marking an entry of a look up table that is associated with the timer ID;
marking the timer ID as available for allocation comprises marking the entry of the look up table; and
wherein the method further comprises determining whether the timer ID is marked as available for allocation by accesses the entry of the look up table.

20. The method of claim 16, wherein instantiating the first timer comprises:
determining a time unit granularity for the first timer;
selecting a timer ring of a plurality of timer rings for the first timer based on the time unit granularity; and
instantiating the first timer in a selected entry of the selected timer ring based on an entry currently accessed in the selected timer ring and based on an initial time span of the first timer.

* * * * *